(12) United States Patent
Seto et al.

(10) Patent No.: US 7,774,575 B2
(45) Date of Patent: Aug. 10, 2010

(54) INTEGRATED CIRCUIT CAPABLE OF MAPPING LOGICAL BLOCK ADDRESS DATA ACROSS MULTIPLE DOMAINS

(75) Inventors: Pak-Lung Seto, Shrewsbury, MA (US); Martin M. Massucci, Stow, MA (US)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 10/945,755

(22) Filed: Sep. 21, 2004

(65) Prior Publication Data

US 2006/0064568 A1 Mar. 23, 2006

(51) Int. Cl.
*G06F 12/00* (2006.01)

(52) U.S. Cl. .............. 711/203; 711/100; 711/114; 711/161; 711/162; 711/200; 711/202; 711/205; 711/206; 711/209; 714/5; 714/6

(58) Field of Classification Search ........... 711/203, 711/114, 161–162, 200, 202, 205–206, 209; 714/5–6; 707/204
See application file for complete search history.

(56) References Cited

U.S. PATENT DOCUMENTS

| | | | | |
|---|---|---|---|---|
| 5,774,643 | A * | 6/1998 | Lubbers et al. | 714/20 |
| 6,502,178 | B1 * | 12/2002 | Olbrich | 711/202 |
| 6,898,668 | B2 * | 5/2005 | Thompson et al. | 711/114 |
| 2003/0140210 | A1 * | 7/2003 | Testardi | 711/203 |

OTHER PUBLICATIONS

"How It Works: CHS Translation" May 6, 2002. Retrieved from http://ata-atapi.com/hiwchs.htm.*
"How It Works: CHS translation", May 6, 2002. Retrieve from http://ata-atapi.com/hiwchs.htm.*
CHS"How it Works:CHS Translation"May 6, 2002.*
PCI Express Base Specification Revision 1.0a; Apr. 15, 2003; 428 pgs. (submitted in 2 parts).
PCI-X Addendum to the PCI Local Bus Specification Revision 1.0a; Jul. 24, 2000; PCI Special Interest Group 240 pgs.
American National Standard: For Information Technology-Fibre Channel-Physical and Signalling Interface-3 (FC-PH-3) Developed by Incits; 1998; 116 pgs.
Serial ATA: High Speed Serialized AT Attachment Revision 1.0a;Jan. 7, 2003, APT Technologies, Inc.; Dell Computer Corporation; Intel Corporation; Maxtor Corporation; Seagate Corporation; 311 pgs.
Information Technology—Serial Attached SCSI—1.1 (SAS-1.1); Working Draft American National Standard: Project T10/1601-D Revision 1; Sep. 18, 2003; 464 pgs.

* cited by examiner

*Primary Examiner*—Tuan V Thai
*Assistant Examiner*—Zhuo H Li
(74) *Attorney, Agent, or Firm*—Christopher K. Gagne (57) ABSTRACT

A method according to one embodiment may include discovering at least one data block comprising logical block address information. The method may also include mapping logical block address information from a first domain into a second domain. Of course, many alternatives, variations, and modifications are possible without departing from this embodiment.

16 Claims, 5 Drawing Sheets

| Physical Disk Representation (P_) vs. Logical Disk Representation (L_) | | | | | | |
|---|---|---|---|---|---|---|
| Disk | Disk 0 | Disk 1 | Disk 2 | Disk 3 | Disk 4 | |
| LBAs | P_LBA0/L_LBA0 | P_LBA0/L_LBA1 | P_LBA0/L_LBA2 | P_LBA0/L_LBA3 | P_LBA0 | 312 |
| | P_LBA1/L_LBA4 | P_LBA1/L_LBA5 | P_LBA1/L_LBA6 | P_LBA1/L_LBA7 | P_LBA1 | 314 |
| | • | • | • | • | • | |
| | • | • | • | • | • | 316 |
| | P_LBA98/L_LBA392 | P_LBA98/L_LBA393 | P_LBA98/L_LBA394 | P_LBA98/L_LBA395 | P_LBA98 | |
| | P_LBA99/L_LBA396 | P_LBA99/L_LBA397 | P_LBA99/L_LBA398 | P_LBA99/L_LBA399 | P_LBA99 | 318 |

INTEGRATED CIRCUIT CAPABLE OF MAPPING LOGICAL BLOCK ADDRESS DATA ACROSS MULTIPLE DOMAINS

FIELD

The present disclosure relates to an integrated circuit capable of mapping logical block address data across multiple domains.

BACKGROUND

In one conventional data storage arrangement, a computer node includes a host bus adapter (HBA). The HBA communicates with one or more storage devices in a data storage system. The HBA may be in one domain, while the storage devices are in another domain. Data transmitted or received by the HBA may include logic block address data affixed to a payload portion of the data frame. As the data is transmitted logical block address information in the data frame may change. In order to track logical block address information, the conventional data storage arrangement may require an additional copy of a data block in memory, where each instance of a data block includes specific logical block address information. Alternatively, the conventional data storage arrangement may provide a look-up table which defines logical block address information. However, a look-up table may be extremely memory and processing intensive, and may thus impede data throughput in the system. Thus, the conventional data storage arrangement is incapable of efficiently mapping logical block address data in data blocks across domains.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
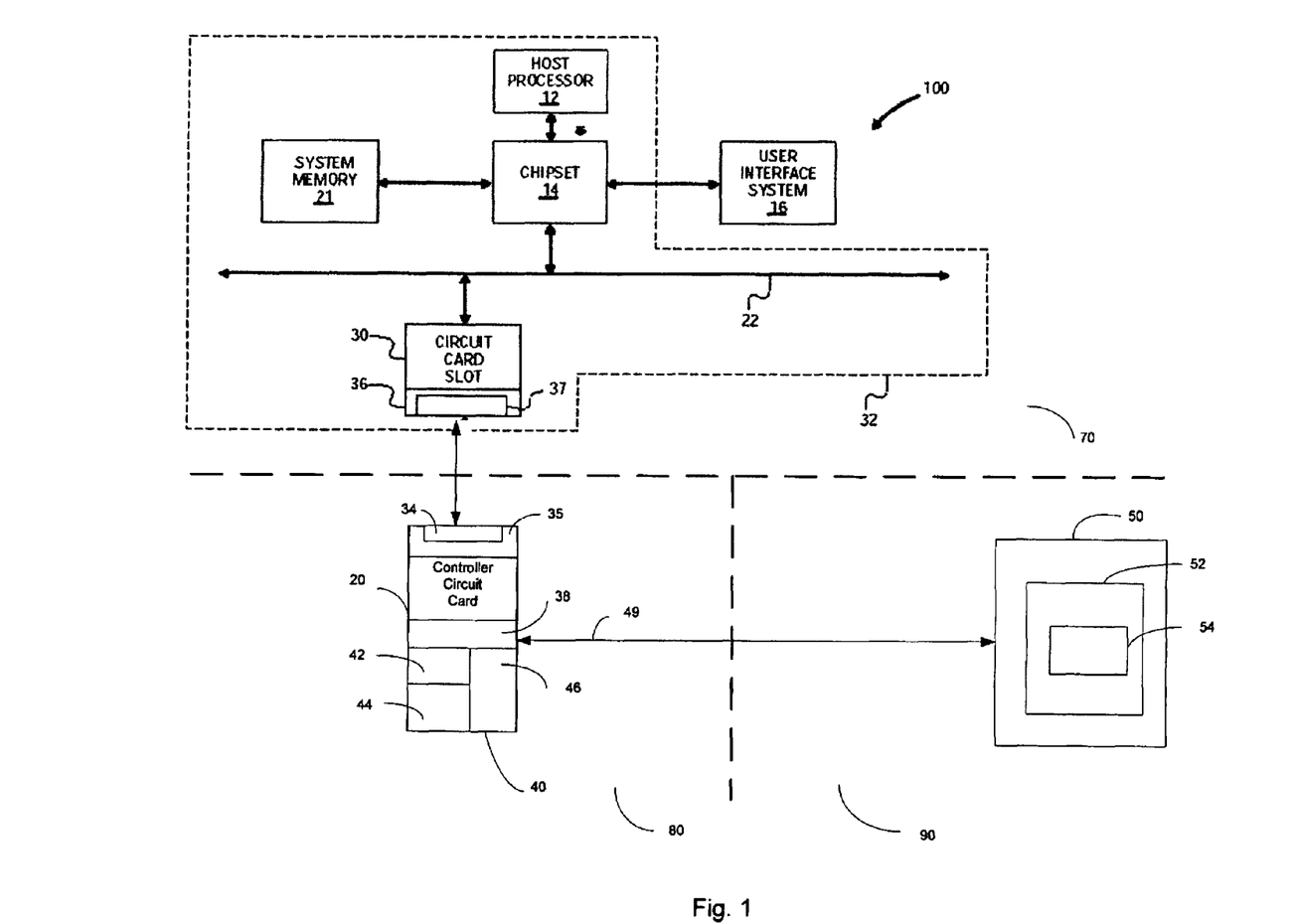
FIG. 1 is a diagram illustrating a system embodiment.

FIG. 1 illustrates a system embodiment 100 of the claimed subject matter. The system 100 may generally include a host processor 12, a bus 22, a user interface system 16, a chipset 14, system memory 21, a circuit card slot 30, and a circuit card 20 configured to communicate with storage array 50. The host processor 12 may include any variety of processors known in the art such as an Intel® Pentium® IV processor commercially available from the Assignee of the subject application. The bus 22 may include various bus types to transfer data and commands. For instance, the bus 22 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 22 may also comply with the PCI-X Specification Rev. 1.0a, Jul. 24, 2000, available from the aforesaid PCI Special Interest Group, Portland, Oreg., U.S.A.

The user interface system 16 may include a variety of devices for human users to input commands and/or data and to monitor the system such as a keyboard, pointing device, and video display. The chipset 14 may include host bridge/hub system (not shown) that couples the processor 12, system memory 21, and user interface system 16 to each other and to the bus 22, and may comprise a host system. Chipset 14 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 12, system memory 21, chipset 14 and circuit card slot 30 may be integrated onto one circuit board, e.g. motherboard 32. The processor 12, system memory 21, chipset 14 and circuit card slot 30 may collectively comprise a host computer system.

The circuit card 20 may be constructed to permit it to be inserted into slot 30. When the circuit card 20 is properly inserted into slot 30, connectors 34 and 37 become electrically and mechanically coupled to each other. When connectors 34 and 37 are so coupled to each other, the card 20 becomes electrically coupled to bus 22 and may exchange data and/or commands with system memory 21, host processor 12, and/or user interface system 16 via bus 22 and chipset 14. Alternatively, without departing from this embodiment, the operative circuitry of the circuit card 20 may be included in other structures, systems, and/or devices. These other structures, systems, and/or devices may be, for example, in the motherboard 32, coupled to the bus 22.

Controller card 20 may be coupled to and control the operation of mass storage 50. In this embodiment, mass storage 50 may comprise, e.g., one or more redundant arrays of independent disks (RAID) 52. RAID 52 may comprise, for example, one or more disk mass storage devices and/or one or more peripheral devices (collectively or singly shown in FIG. 1 by the block referred to by numeral 54). The RAID level that may be implemented by RAID 52 may be a RAID level that stripes data across two or more disks 54 comprised in RAID 52. For example, RAID level 0, 2, 3, 4, 5, and/or 6 each support stripping of data across two or more disks 54 comprised in RAID 52.

Circuit card 20 may communicate with storage array 50 using a plurality of communications protocols. The circuit card 20 may comprise an integrated circuit 40 and an article such as or comprising computer-readable memory 38. As used in any embodiment herein, an "integrated circuit" means a semiconductor device and/or microelectronic device, such as, for example, a semiconductor integrated circuit chip. Memory 38 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 38 may comprise other and/or later-developed types of computer-readable memory. Machine readable firmware program instructions may be stored in memory 38. These instructions may be accessed and executed by the integrated circuit 40. When executed by the integrated circuit 104, these instructions may result in the integrated circuit 40 performing the operations described herein as being performed by the integrated circuit 40.

Integrated circuit 40 may comprise initiator engine circuitry 42 (herein after "initiator 42"), RAID controller circuitry 44 and/or logical block address mapping circuitry 46. As used in any embodiment herein, "circuitry" may comprise, for example, singly or in any combination, hardwired circuitry, programmable circuitry, state machine circuitry, and/or firmware that stores instructions executed by programmable circuitry.

Initiator 42 may be capable of initiating communication between the host system and the storage array 50 using a plurality of different communication protocols. If a Fibre Channel (FC) protocol is used by initiator 42 to exchange data and/or commands with storage array 50, it may comply or be compatible with the interface/protocol described in ANSI Standard Fibre Channel Physical and Signaling Interface-3 X3.303:1998 Specification. Alternatively or additionally, if a serial ATA (S-ATA) protocol is used by initiator 42 to exchange data and/or commands with storage array 50, it may comply or be compatible with the protocol described in "Serial ATA: High Speed Serialized AT Attachment," Revision 1.0, published on Aug. 29, 2001 by the Serial ATA Working Group. Further alternatively or additionally, if a serial attached small computer system interface (SAS) protocol is used by initiator 42 to exchange data and/or commands with storage array 50, it may comply or be compatible with the protocol described in "Information Technology—Serial Attached SCSI—1.1, " Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. The SAS protocol may comprise Serial Advanced Attachment (ATA) Tunneled Protocol (STP) and Serial Small Computer System Interface (SCSI) Protocol (SSP). Of course, other alternative communication protocols and/or after-developed communication protocols may be used by circuit card 20 without departing from this embodiment, and such alternative and/or after-developed communications protocols shall be deemed equivalent communications protocols.

Card 20 may be coupled to mass storage 50 via one or more network communication links 49. As set forth above, card 20 may exchange data and/or commands with mass storage 50, via link 49, using, e.g., S-ATA, SAS and/or FC communication protocols. Of course, alternatively, card 20 may exchange data and/or commands with mass storage 50 using other and/or additional communication protocols, without departing from this embodiment.

In this embodiment, RAID controller circuitry 44 may be capable of performing RAID-related operations. RAID controller circuitry 44 may be capable of generating one or more I/O transactions to exchange commands and data, for example, between the circuit card 20 and the storage array 50. "Transaction", as used herein, may be defined as a read or write operation which may be performed, for example, between memory 38 and one or more storage devices 54 comprised in RAID 52. RAID controller circuitry 44 may be capable of determining and/or discovering, for example, the RAID type which may be implemented by RAID 52, the number of storage devices (e.g., disks 54) present in RAID 52, and the data stripe size for the RAID type implemented by RAID 52.

The system embodiment of FIG. 1 may comprise a plurality of domains, for example, domain 70, domain 80, and/or domain 90. As will be detailed herein, a domain may be defined as a device or collection of devices in which logical block address information may change from another device or collection of devices. For example, Domain 70 may comprise the host computer system. In this domain, an application may be executed. The application executed in domain 70 may be capable of defining a plurality of virtual disks. One or more virtual disk comprised in domain 70 may represent one or more physical media (for example, one or more disks 54) comprised in RAID 54. Domain 70 may therefore comprise a virtual domain. Domain 90 may comprise mass storage 50, which may comprise RAID 52. RAID 52 may comprise physical media, for example, a plurality of disks 54. RAID 52 may comprise a RAID level in which data may be written to the plurality of disks 54 (e.g., physical media) in a stripped manner. Domain 90 may therefore comprise a physical domain. Domain 80 may comprise circuit card 20. In domain 80, the circuit card 20 may be capable of storing data in memory 38. The data stored in memory 38 may comprise, for example, a logical representation of data in domain 90 (i.e., a logical representation of data on one or more physical disks 54). Domain 80 may therefore comprise a logical domain. Alternatively or additionally, circuit card 20 may be capable of defining a plurality of virtual disks (which may represent one or more physical media comprised in RAID 54), and thus domain 80 may alternatively or additionally comprise a virtual domain.

Figure 2:
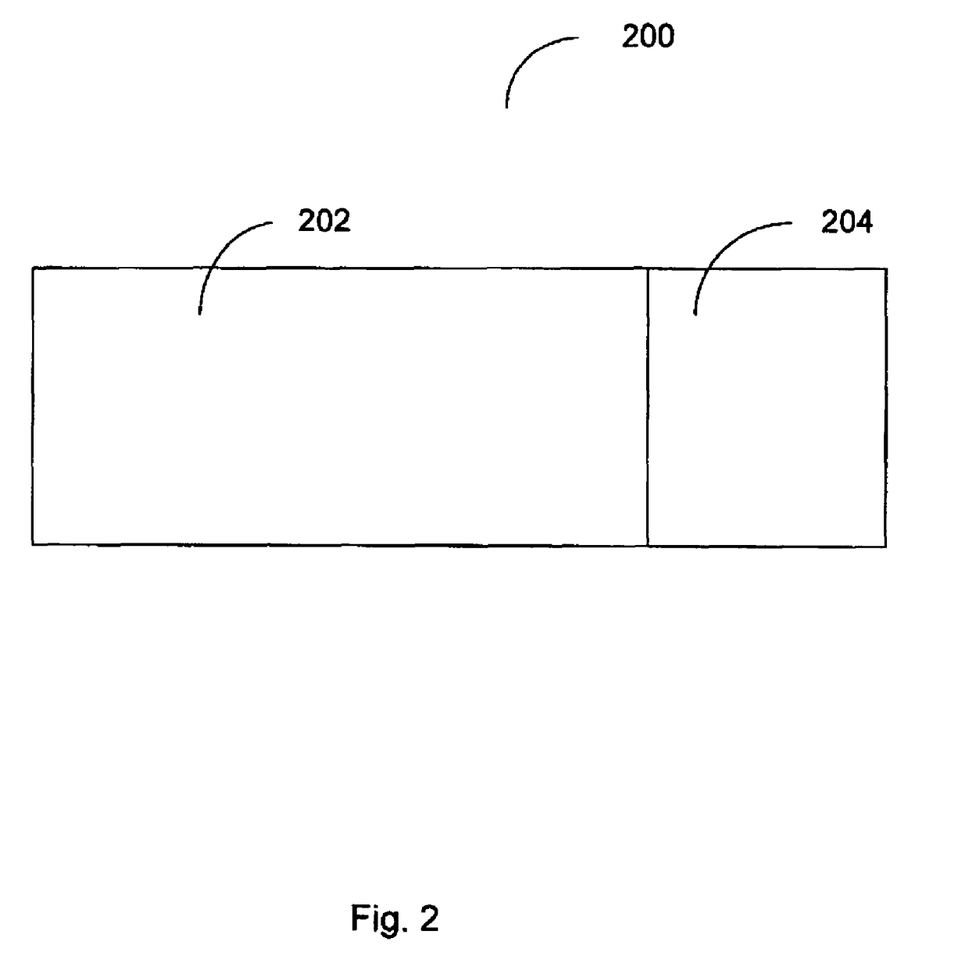
FIG. 2 is a diagram illustrating an exemplary data block.

Data may be transmitted and/or accessed between domains, such as domains 70, 80, and/or 90. Data may comprise a block which may be transmitted and/or received and/or stored in one or more domains. A "block", as used in any embodiment herein, may comprise a sequence of symbols. Each block may comprise a predefined number of addressable units. Referring to FIG. 2, an exemplary block 200 is depicted. A block 200 may comprise a payload data block 202 and metadata 204. The payload data block 202 may comprise, for example, a predefined number of data bytes. Metadata 204 may comprise logical block address (LBA) information. Metadata 204 may also comprise error checking information. LBA information may comprise information which may specify where the block 200 is located in memory in a given domain to permit, for example, addressability of the payload data block 202 comprised in block 200. Integrated circuit 40 may be capable, at least in part, of discovering a block 200 comprising LBA information.

Circuit card 20 may interpret a plurality of disks 54 comprised in RAID 52 as a single logical disk. Assuming that domain 80 is a logical domain, when a block 200 is mapped into domain 80, circuit card 20 may be capable of assigning unique logical LBA (L_LBA) information to each block 200. One or more data blocks 200 received by circuit card 20 may be destined for RAID 52 and may be stored in memory 38 as a logical representation of RAID 52.

In a RAID level that utilizes striping (e.g., RAID level 0, 2, 3, 4, 5 and/or 6) data may be stripped across two or more disks 54 comprised in the RAID 52. The strip size for each strip may be determined by, for example, user definable parameters and/or configuration parameters associated with the RAID level. RAID controller circuitry 44 may be capable of reading one or more data blocks 200 in memory 38 and writing data to RAID 52. Thus, if RAID 52 is a RAID level that utilizes stripping, RAID controller circuitry 44 may be capable of reading one or more blocks 200 in memory 38 and striping the blocks across two or more disks 54 comprised in RAID 52. Of course, it is equally contemplated herein that RAID controller circuitry 44 is comprised in RAID 52, and may capable of RAID-related operations as may be described herein.

In order to preserve a relationship between LBA information (comprised in metadata 204) and a payload portion 202 of a given block 200, LBA information may be mapped between domains. In at least one embodiment herein, LBA information may be mapped as a block is transmitted between two or more domains. To that end, integrated circuit 40 may also comprise LBA mapping circuitry 46 which may be capable of mapping LBA information, for example LBA information comprised in metadata 204 comprised in a block 200, from at least one domain into at least one other domain. Thus, for example, when block is received by circuit card 20, LBA mapping circuitry 46 may be capable of mapping LBA information comprised in a block from another domain (for example a physical domain 90 and/or virtual domain 70) into a logical domain 70. Likewise, when integrated circuit 40 transmits a block comprising LBA information into another domain (for example a physical domain 90 and/or virtual domain 70) LBA mapping circuitry 46 may be capable of mapping LBA information comprised in a block in the logical domain 80 into another domain. LBA mapping circuitry 46 may be capable of receiving LBA information in one domain and mapping LBA information into another domain based on, for example, one or more domain variables.

With specific reference to the logical domain 80 and the physical domain 90, domain variables may comprise, for example, RAID type, number of disks present in a RAID, the strip size designated by the RAID, the size of the payload 202 of a block 200 and/or the number of LBAs present in a given domain. "Mapping", as used in any embodiment herein, may be defined as translating. Thus, LBA mapping circuitry 46 may be capable of translating LBA information between domains.

Figure 3:
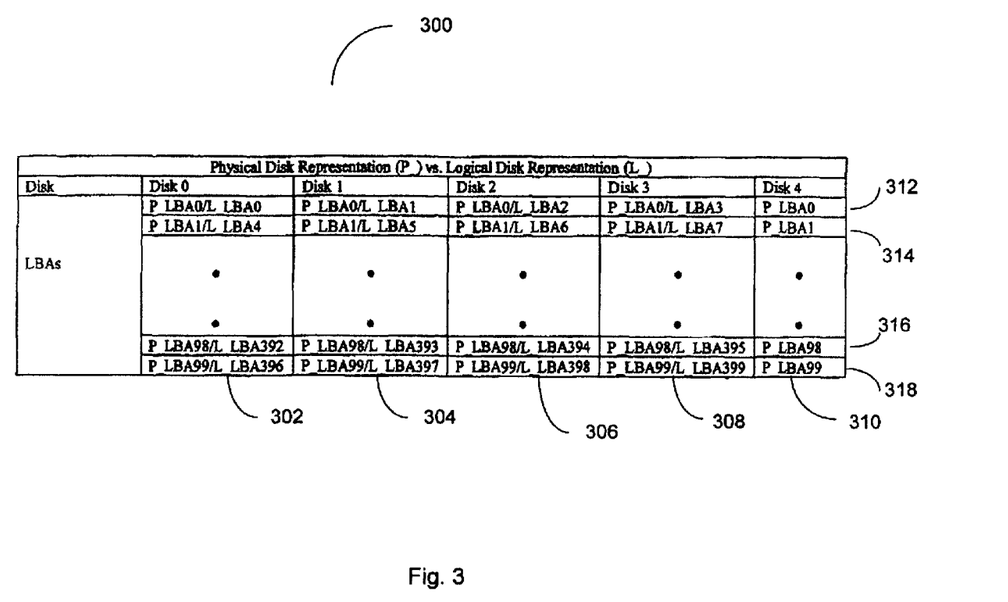
FIG. 3 is a diagram illustrating an exemplary table of relationships for logical block address data between a logical domain and a physical domain.

By way of example, FIG. 3 depicts a table 300 representing a relationship between logical LBA information (L_LBA) and physical LBA information (P_LBA). A logical domain, as described herein, may comprise a RAID controller, such as controller circuit card 20 depicted in FIG. 1. A physical domain, as described above, may comprise a RAID, such as RAID 52 comprised in mass storage 50 depicted in FIG. 1. In the exemplary table 300 of FIG. 3, assume that the disks (Disk 0, Disk 1, Disk 2, Disk 3 and Disk 4) represent a set of stripe disks in a RAID, and that the RAID comprises a RAID level that stripes data across these disks. The RAID level may designate a plurality of disks (such as disks 54) as data disks, and may also designate one or more disks as parity disks. Data blocks in the logical domain may be stripped across one or more data disk in the physical domain. In this example, Disk 0 through Disk 3 may each represent data disks and Disk 4 may represent a parity disk.

The relationship between logical and physical LBA information may reflect that LBA information representing the logical domain 80 may be translated onto physical media, such as one or more disks 54 comprised in storage array 50, and vice versa. In the example of FIG. 3, columns 302, 304, 306, 308 and 310 may represent the relationship between logical LBA information (L_LBA) and physical LBA information (P_LBA) for Disk 0, Disk 1, Disk 2, Disk 3 and Disk 4, respectively. Rows 312, 314, . . . , 316 and 318 may represent the location of a block in a physical domain. When a block is mapped into a physical domain, logical LBA information comprised in a block may be mapped to physical LBA information corresponding to a disk number and location on a disk. In this example, assume that there are 400 logical LBAs mapped into a logical domain. Also, in this example, assume that the data block size for the payload portion of each block is 512 Bytes and the stripe size on each disk is 2048 Bytes. Thus, four frames, each comprising four 512 Byte payload portions and a logical LBA in the logical domain may be stripped across Disks 0 through 3 in the physical domain.

In this example, Disk 4 may comprise a single parity disk. The parity disk may use the same P-LBA information for each stripe across Disk 0-Disk 3. A single parity disk may be used, for example in RAID level 4 and/or 5. Of course, additional parity disks may be used, depending on the RAID level.

As depicted in Row 312 of table 300, L_LBA0 may correspond to P_LBA0 on Disk 0. L_LBA 1 may correspond to P_LBA0 on Disk 1. L_LBA 2 may correspond to P_LBA 0 on disk 2, and L_LBA 3 may correspond to P_LBA 0 on disk 3. The stripping process of blocks may continue, for example, L_LBA 4 may correspond to P_LBA 1 on Disk 0, and so on, as depicted in table 300. For blocks that include a payload 202 and LBA information (comprised in metadata 204), LBA information may be mapped between domains to maintain an association between a payload 202 and metadata 204 of a block 200.

A mathematical relationship may exist to define a translation of LBA information between domains. LBA mapping circuitry 46 may comprise arithmetic acceleration circuitry capable of translating LBA information between domains. Such arithmetic acceleration circuitry may be capable of executing a mathematical relationship based on, for example, one or more domain variables. As described above, RAID controller circuitry 44 may be capable of determining and/or discovering one or more domain variables, for example, a RAID level, the number of disks in the RAID (such as RAID 52), the stripe size defined by the RAID level, the block size of a payload portion of a frame, and/or the number of LBAs in a given domain. LBA mapping circuitry 46 may be capable of performing mathematical operations to translate LBA information from one domain into another domain based on at least one domain variable.

For example, LBA mapping circuitry 46 may be capable of performing a mathematical operation of the form:

Mod (n) L_LBA (p); where the integer result may correspond to a P_LBA number and the remainder result may correspond to the disk number, among a plurality of disk 54, comprised in the RAID 52. LBA mapping circuitry 46 may also be capable of performing the inverse of this operation to generate map one or more logical LBAs from one or more physical LBAs. Of course, this mathematical operation is provided only as an example, and alternative and/or additional operations may be performed by LBA mapping circuitry 46 to map LBA information between domains, and all such alternative and/or additional operations are equally contemplated herein. While specific reference is provided herein for logical and/or physical domain variables, it should be understood that other domain variables which may correspond to other domains are equally contemplated herein, and such alternatives may be used in place of, or in addition to, the domain variables described herein to carry out LBA mapping between domains.

Figure 4:
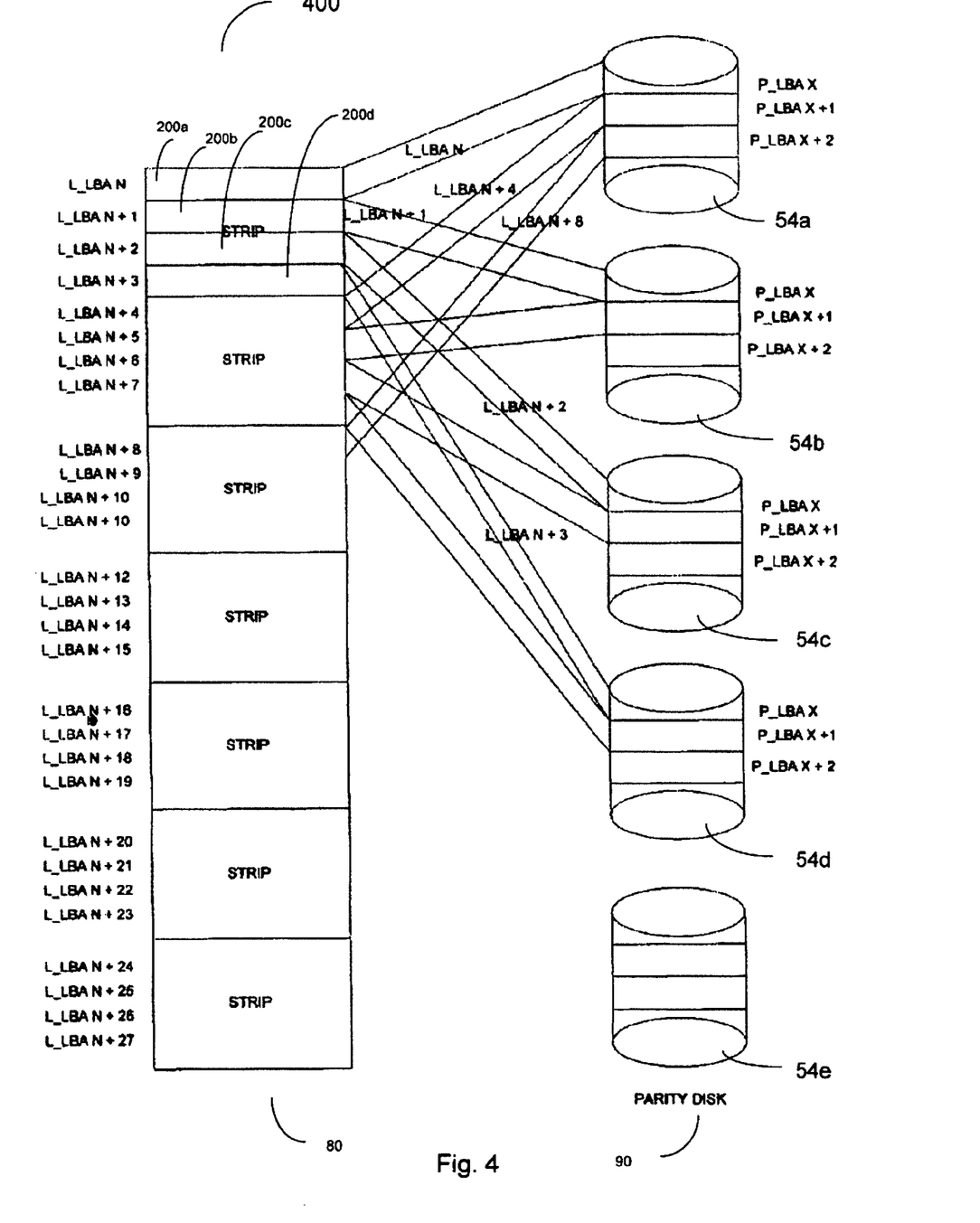
FIG. 4 is a diagram illustrating an example of data blocks mapped in logical and physical domains.

FIG. 4 is a diagram illustrating an example 400 of data blocks mapped in logical and physical domains. The example 400 includes reference to certain components depicted in the system embodiment of FIG. 1 and the block 200 depicted in FIG. 2. However, certain portions of the system 100 depicted in FIG. 1 have been omitted for clarity (for example, the motherboard 32 and circuit card 20), but it is to be understood that like parts of FIG. 4 can be implemented in a manner consistent with an embodiment depicted in FIG. 1, or alternatively in other system implementations, without departing from this embodiment.

System 400 may comprise a logical domain 80 and a physical domain 90. The logical domain 70 may comprise a plurality of blocks 200a, 200b, 200c, 200d, each comprising logical LBA information L_LBA N. L_LBA N+1, L_LBA N+2, L_LBA N+3, respectively. Each of the blocks in the logical domain 80 may be stored in memory (not shown) and accessed via logical LBA (L_LBA) information. Additional blocks may exists in the logical domain 80, depicted graphically as logical LBA information L_LBA N+4 through L_LBA N+27. The physical domain 90 may comprise a RAID level the stripes data across two or more disks. To that end, in this example, the physical domain 90 may comprise four data disks 54a, 54b, 54c and 54d and a parity disk 54e. The RAID stripe size in the physical domain 90 may correspond to four blocks in the logical domain 80. In this example, L_LBA N may be mapped to disk 54a in the physical domain 90 and may correspond to physical LBA P_LBA X. Similarly, L_LBA N+1 may be mapped to disk 54b and may correspond to physical LBA P_LBA X. Likewise, L_LBA N+2 may be mapped to disk 54c, corresponding to P_LBA X, and L_LBA N+3 may be mapped to disk 54d, corresponding to P_LBA X. The RAID level may specify a return to disk 54a, where the next block may be stored. Thus, L_LBA N+4 may be mapped to disk 54a and may correspond to P_LBA X+1.

Figure 5:
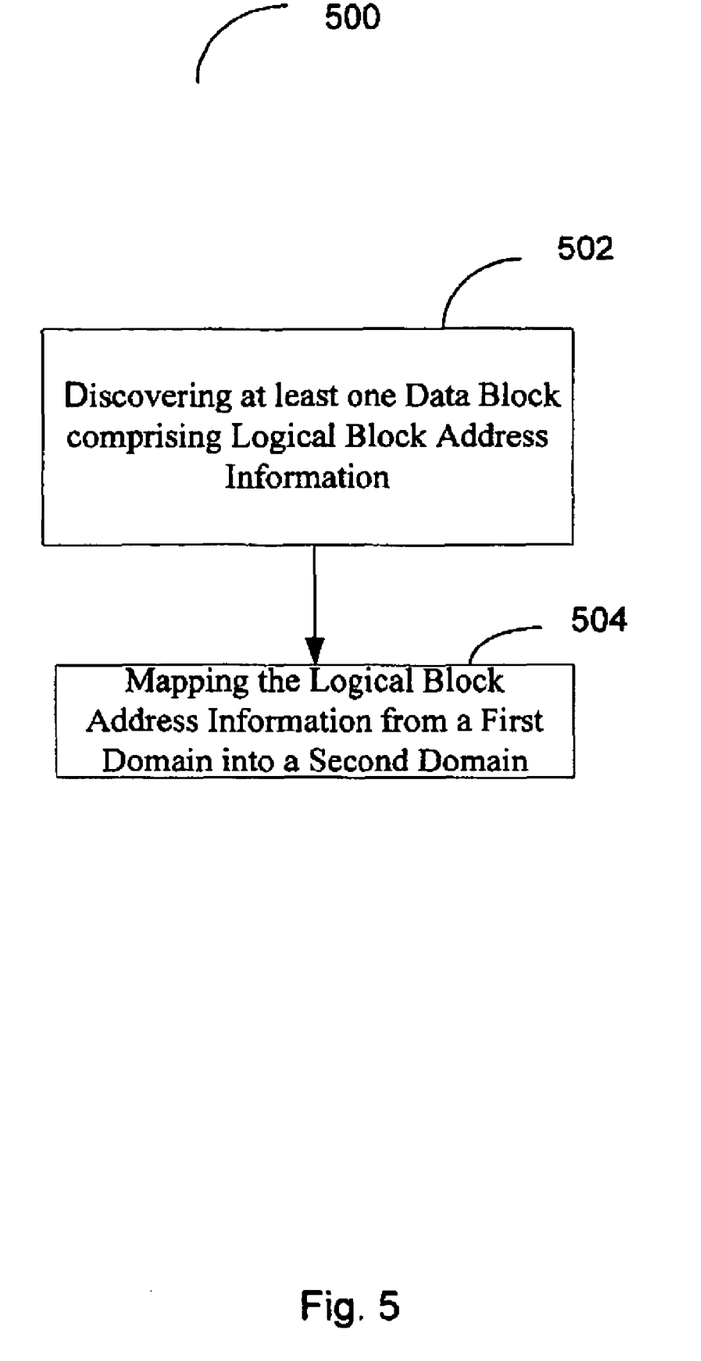
FIG. 5 is a flowchart illustrating exemplary operations according to one embodiment.

FIG. 5 is a flowchart 500 illustrating exemplary operations according to one embodiment. Operations may comprise discovering, at least in part, by an integrated circuit, at least one data block comprising logical block address information 502. Operations may also comprise mapping, by an integrated circuit, the logical block address information from a first domain into a second domain.

It should be apparent from the examples provided herein that LBA mapping circuitry 46 may be capable of mapping, for example logical LBA information (L_LBA) to physical LBA information (P_LBA), and vice versa. Additionally or alternatively, LBA mapping circuitry 46 may be capable of mapping LBA information comprised in one or more data blocks between any number of domains, including but not limited to, a virtual, logical and/or physical domain. In an alternative embodiment LBA information may be added to the block 200 on a per domain basis (instead of replacing). Thus, for example a block 200 comprising a payload portion 202 and metadata 204 in a first domain may be treated as a block comprising a payload portion in a second domain. In the second domain, additional metadata may be affixed to the block. The additional metadata may include logical block address information of the second domain, and thus, the block thus formed may comprises LBA information from both the first and second domain. Of course, this example can be expanded to additional domains. In such an embodiment, logical block address information for a given domain may be mapped from the payload portion of a data block by extracting LBA information contained therein.

Depending on the RAID level and/or the data block transmitted or received by integrated circuit 40, it may be inappropriate in some instances to map LBA information between domains. Thus, integrated circuit 40 may be capable of disabling LBA mapping circuitry 46 on an I/O transaction basis and/or global basis, and may do so without effecting other operations of, and/or circuitry comprised in, the integrated circuit 40.

Thus, in summary, one apparatus embodiment described herein may comprise an integrated circuit capable of discovering, at least in part, at least one data block comprising logical block address information. The integrated circuit may further be capable of mapping, at least in part, logical block-address information from a first domain into a second domain.

Also in summary, one system embodiment may comprise a circuit card including an integrated circuit, the circuit card capable of being coupled to a bus, the integrated circuit capable of discovering, at least in part, at least one data block comprising logical block address information, said integrated circuit further capable of mapping, at least in part, said logical block address information from a first domain into a second domain.

The integrated circuit of these embodiments may offer enhanced data transmission capabilities, and may increase data throughput between domains. Additionally, the integrated circuits of these embodiments may offer reduced memory requirements for data blocks that comprise LBA information, thus permitting, for example, mapping of LBA information across two or more domains using a single instance of LBA information in memory. This may improve the utility and/or versatility of the integrated circuit of these embodiments, by providing mapping of LBA information across multiple domains without additional memory requirements and while maintaining data integrity and addressability in any domain.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:
    discovering by redundant array of independent disks (RAID) controller circuitry domain variables, the RAID controller circuitry being comprised in a circuit card, the domain variables comprising block size of a frame payload portion, number of logical block addresses in a given domain, and RAID stripe size;
    discovering at least one data block comprising logical block address information; and
    executing a mapping operation by logical block address mapping circuitry comprised in the circuit card, the mapping operation being to translate the logical block address information from a first domain to a second domain and being based upon the domain variables,
    the first domain comprising a logical domain, the second domain comprising a physical domain; and
    disabling, on an input/output transaction basis, the logical block address mapping circuitry, while continuing to permit operation of the RAID controller circuitry.

2. The method of claim 1, wherein:
    the mapping operation comprises translating a logical domain logical block address into a physical domain logical block address.

3. The method of claim 1, wherein said mapping operation results in a remainder result and the remainder result of said mapping operation corresponds to a disk number.

4. An apparatus, comprising:
    an integrated circuit comprising logical block address mapping circuitry capable of discovering, at least in part, at least one data block comprising logical block address information, said integrated circuit also comprising redundant array of independent disks (RAID) controller circuitry to discover domain variables, the domain variables comprising block size of a frame payload portion, number of logical block addresses in a given domain, and RAID stripe size, the mapping circuitry further to execute a mapping operation to translate the logical block address information from a first domain to a second domain, the mapping operation being based upon the domain variables, the first domain comprising a logical domain, the second domain comprising a physical domain, the integrated circuit also being to disable, on an input/output transaction basis, the mapping circuitry while continuing to permit operation of the RAID controller circuitry.

5. The apparatus of claim 4, wherein:
the mapping operation comprises translating a logical domain logical block address into a physical domain logical block address.

6. The apparatus of claim 4, wherein:
said first domain comprising a logical domain and said logical block address information comprises a logical domain logical block address, said second domain comprising a redundant array of independent disks comprising two or more disks, wherein said logical block address information comprises a physical domain logical block address stored on at least one said disk, said integrated circuit further capable translating between said logical domain logical block address and said physical domain logical block address.

7. The apparatus of claim 6, wherein:
said integrated circuit further comprising a redundant array of independent disks controller circuitry capable of exchanging commands and data with said redundant array of independent disks.

8. The apparatus of claim 4, wherein said mapping operation results in a remainder result and the remainder result of said mapping operation corresponds to a disk number.

9. An article, comprising:
a storage medium having stored thereon instructions that when executed by a machine result in the following:
discovering by redundant array of independent disk (RAID) controller circuitry domain variables, the RAID controller circuitry being comprised in a circuit card, the domain variables comprising block size of a frame payload portion, number of logical block addresses in a given domain, and RAID stripe size;
discovering at least one data block comprising logical block address information;
executing a mapping operation by logical block address mapping circuitry comprised in the circuit card, the mapping operation being to translate the logical block address information form a first domain to a second domain and being based upon the domain variables, the first domain comprising a logical domain, the second domain comprising a physical domain; and
disabling, on an input/output transaction basis, the logical block address mapping circuitry while continuing to permit operation of the RAID controller circuitry.

10. The article of claim 9, wherein:
the mapping operation comprises translating a logical domain logical block address into a physical domain logical block address.

11. The article of claim 9, wherein said mapping operation results in a remainder result and the remainder result of said mapping operation corresponds to a disk number.

12. A system, comprising:
a circuit card including an integrated circuit, the circuit card capable of being coupled to a bus, the integrated circuit comprising redundant array of independent disks (RAID) controller circuitry and logical block address mapping circuitry, the RAID controller circuitry being to discover domain variables comprising block size of a frame payload portion, number of logical block addresses in a given domain, and RAID stripe size, the mapping circuitry being capable of discovering, at least in part, at least one data block comprising logical block address information and also being to execute a mapping operation to translate the logical block address information from a first domain to a second domain and being based upon the domain variables, the first domain comprising a logical domain, the second domain comprising a physical domain, the integrated circuit also being to disable, on an input/output transaction basis, the logical block address mapping circuitry while continuing to permit operation of the RAID controller circuitry.

13. The system of claim 12, wherein:
said first domain comprising said circuit card and said logical block address information comprises a first domain logical block address, said second domain comprising a redundant array of independent disks comprising two or more disks, wherein said logical block address information comprises a second domain logical block address stored on at least one said disk, said integrated circuit further capable translating between said first domain logical block address and said second domain logical block address.

14. The system of claim 12, wherein:
wherein said redundant array of independent disks comprises a redundant array of independent disks level wherein one or more said data blocks are stripped across two or more said disks.

15. The system of claim 12, wherein:
said data block comprising a payload portion and metadata, said metadata comprising respective logical block address information of the first domain, and wherein said integrated circuit is further capable of affixing, to said data block, additional metadata comprising other respective logical block address information of said second domain.

16. The system of claim 12, wherein said mapping operation results in a remainder result and the remainder result of said mapping operation corresponds to a disk number.

* * * * *